(12) United States Patent
Macklin (10) Patent No.: US 12,474,058 B1
(45) Date of Patent: Nov. 18, 2025

(54) MOBILE GRILL WITH SPRINKLER SYSTEM

(71) Applicant: Stephen M. Macklin, Oakwood Village, OH (US)

(72) Inventor: Stephen M. Macklin, Oakwood Village, OH (US)

( * ) Notice: Subject to any disclaimer, the term of this patent is extended or adjusted under 35 U.S.C. 154(b) by 361 days.

(21) Appl. No.: 17/982,345

(22) Filed: Nov. 7, 2022

(51) Int. Cl.
| | |
|---|---|
| F24C 1/16 | (2021.01) |
| A23B 4/052 | (2006.01) |
| A47J 37/00 | (2006.01) |
| A47J 37/07 | (2006.01) |
| A62C 3/00 | (2006.01) |
| B60P 3/22 | (2006.01) |
| F24C 15/02 | (2006.01) |

(52) U.S. Cl.
CPC ............... *F24C 1/16* (2013.01); *A23B 4/052* (2013.01); *A47J 37/0704* (2013.01); *A47J 37/0786* (2013.01); *A62C 3/006* (2013.01); *B60P 3/225* (2013.01); *B60P 3/2265* (2013.01); *F24C 15/023* (2013.01)

(58) Field of Classification Search
CPC .... A47J 36/12; F24C 15/02; E05Y 2201/654; A21B 3/02; F24B 13/004; A62C 3/006
See application file for complete search history.

(56) References Cited

U.S. PATENT DOCUMENTS

| | | | | |
|---|---|---|---|---|
| 4,086,849 | A | * | 5/1978 | Simmons ............ A47J 37/0713 99/421 H |
| 4,348,948 | A | * | 9/1982 | Allison ................. A47J 37/046 126/18 |
| 4,757,755 | A | | 7/1988 | Sarten |
| 4,757,756 | A | * | 7/1988 | Van Marr ........... A47J 37/0704 99/476 |
| 5,950,617 | A | | 9/1999 | Lorenz |
| 5,988,158 | A | * | 11/1999 | Schmidt, Jr. ............ F24B 1/207 126/41 R |
| 6,557,547 | B1 | | 5/2003 | MacIntosh |
| 6,736,050 | B1 | | 5/2004 | Moon |
| D646,121 | S | | 10/2011 | Pickard |
| 10,638,880 | B2 | | 5/2020 | Watson, Jr. |
| 10,821,872 | B2 | | 11/2020 | Bates et al. |
| 12,179,612 | B2 | * | 12/2024 | Metzler ................... B60L 58/18 |
| 2008/0257331 | A1 | * | 10/2008 | Lockhart ................ A47J 36/12 126/192 |

* cited by examiner

*Primary Examiner* — Deming Wan
(74) *Attorney, Agent, or Firm* — Cramer Patent & Design, PLLC.; Aaron R. Cramer (57) ABSTRACT

The mobile grill with sprinkler system may comprise a grill, a sprinkler system, a smoker, an oven, and a trailer. The grill, the smoker, and the oven may be coupled to the top of the trailer such that the grill, the smoker, and the oven may be towed to a venue for use. The mobile grill with sprinkler system may be operable to cook and/or heat food. As non-limiting examples, the grill and the smoker may be operable to cook meat while the oven maintains side dishes at an elevated temperature. The sprinkler system located within the grill may be adapted to dispense water inside of the grill when activated by a user.

2 Claims, 7 Drawing Sheets

MOBILE GRILL WITH SPRINKLER SYSTEM

RELATED APPLICATIONS

Non-applicable.

FIELD OF THE INVENTION

The presently disclosed subject matter is directed generally to a grill and more specifically to a grill with a sprinkler system.

BACKGROUND OF THE INVENTION

Cookouts and barbecues are among the most popular warm weather activities for families and friends. Whether it be small family outings or large public or private gatherings, one is likely to find a barbecue grill nearby. In the instance where there is a large number of people to feed, many grills are often seen in simultaneous use. As one can imagine, keeping these grills operating, full of fuel, at the right temperature, remembering which grill has which food, whether or not the food is done, and the like, becomes quite a chore.

Additionally, all of these grills must be transported to the cookout location which is quite a chore in and of itself. Finally, one needs workspace to prepare and hold the food when it is not on the grill or grills. Accordingly, the need has developed for a large, portable barbecue grill that is easy to transport while providing a means by which a large amount of food can be cooked. The development of the grill with sprinkler system fulfills this need.

SUMMARY OF THE INVENTION

The present invention provides for a mobile grill with sprinkler system that has, a grill having a hollow, capsule-shaped enclosure mounted in a horizontal orientation on a trailer above a plurality of wheels, a sprinkler system having one or more sprinkler heads, a supply hose, a water reservoir, a water pump, and a sprinkler control, a smoker coupled on top of the trailer adjacent to the grill, and an oven integrated into the rear of the grill on top of the trailer, wherein the trailer includes a frame, the wheels, a plurality of fenders, and a lighting system. The frame includes a tongue disposed on the front of the frame adapted for coupling to a tow vehicle. The smoker maintains a low cooking temperature for an extended time while adapted to circulate smoke around a piece of meat held on one or more smoker racks within the smoker. The oven is heated by a heat source located in the grill, the oven includes a second enclosure that is operable to heat the food held on one or more oven racks within the oven. The sprinkler system is adapted to dispense a plurality of water within an interior of the grill when the sprinkler system is activated.

The heat source may be located at below the grill to heat the interior of the grill to cook within the grill. The grill may include a left door and a right door for accessing the interior of the grill. The left door or the right door may define the front of the grill. The left door or the right door may include a curved door panel that conforms to the side of the grill. The left door or the right door may be hingedly coupled to the grill at the top of the curved door panel via one or more hinges. A door cable may be coupled to the left door or the right door above a door handle. The door cable may be routed to a door motor via a door pulley located on top end of a door arm above the left door or the right door. The left door or the right door may provide access to an upper rack and a lower rack.

The upper rack and the lower rack may be horizontally oriented, and the upper rack may be located above the lower rack. The upper rack and the lower rack may be configured to support the food while the food is being heated within the grill. The upper rack and the lower rack may be supported by a plurality of rack rails that may be horizontally oriented and coupled to a plurality of interior surfaces of the grill, with the rack rails running from front of the grill to rear of the grill. The upper rack and the lower may rack slide along the rack rails such that the upper rack and the lower rack slide forward for access to the food and slide rearward to place the upper rack and the lower rack entirely within the grill. The mobile grill with sprinkler system may comprise a work surface coupled to the front of the grill below the left door and the right door. The work surface may include a first tray, and a second tray may be installed within the work surface. The grill may include a plurality of smokestacks to discharge smoke above the grill and to induce a draft through the grill. The smokestacks may include a smokestack damper. The one or more oven racks may be accessible by opening one or more oven doors. The lighting system may be electrically coupled to the electrical system of the tow vehicle via an electrical connector located adjacent to the tongue. A rechargeable and/or replaceable battery may be coupled to the trailer that includes one or more energy-storage devices.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
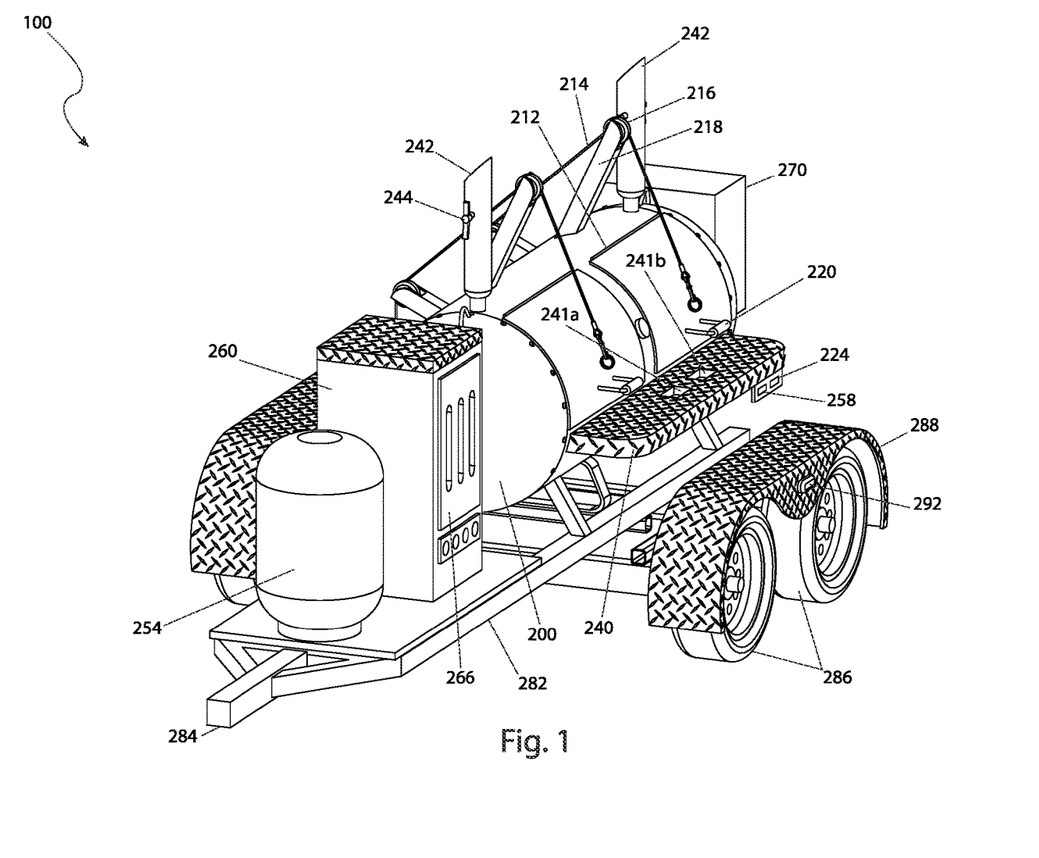
FIG. 1 is an isometric view of a mobile grill with sprinkler system, according to an embodiment of the present invention.
Figure 2:
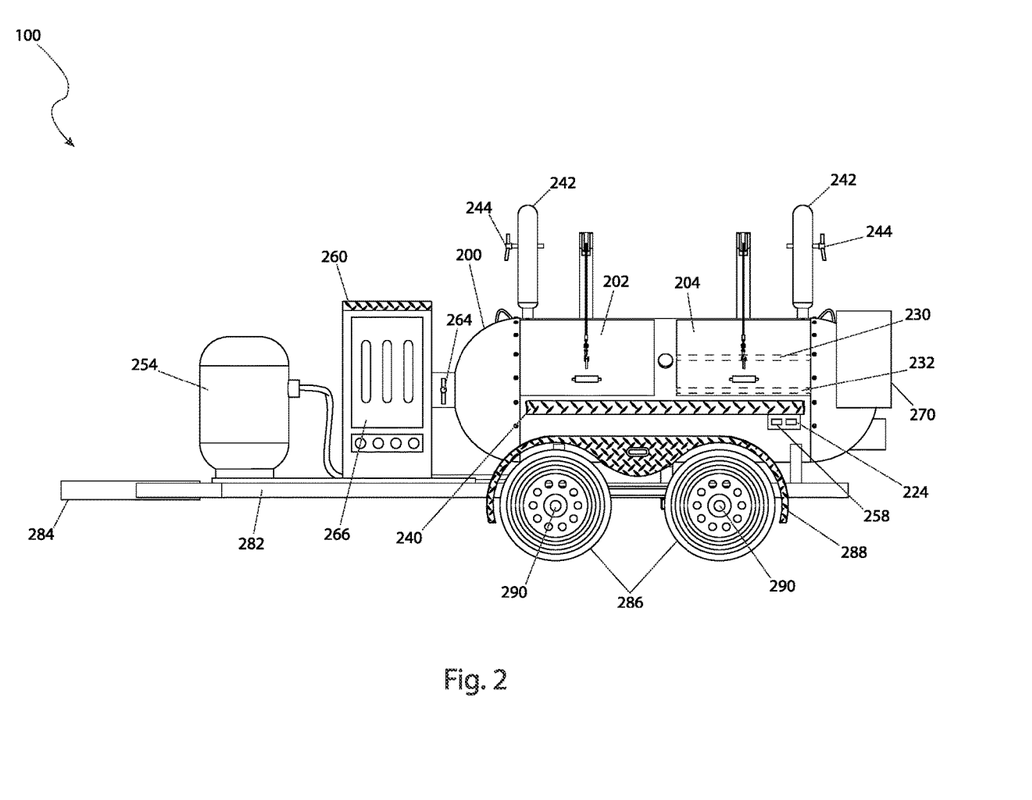
FIG. 2 is a left-side view of a mobile grill with sprinkler system, according to an embodiment of the present invention.
Figure 3:
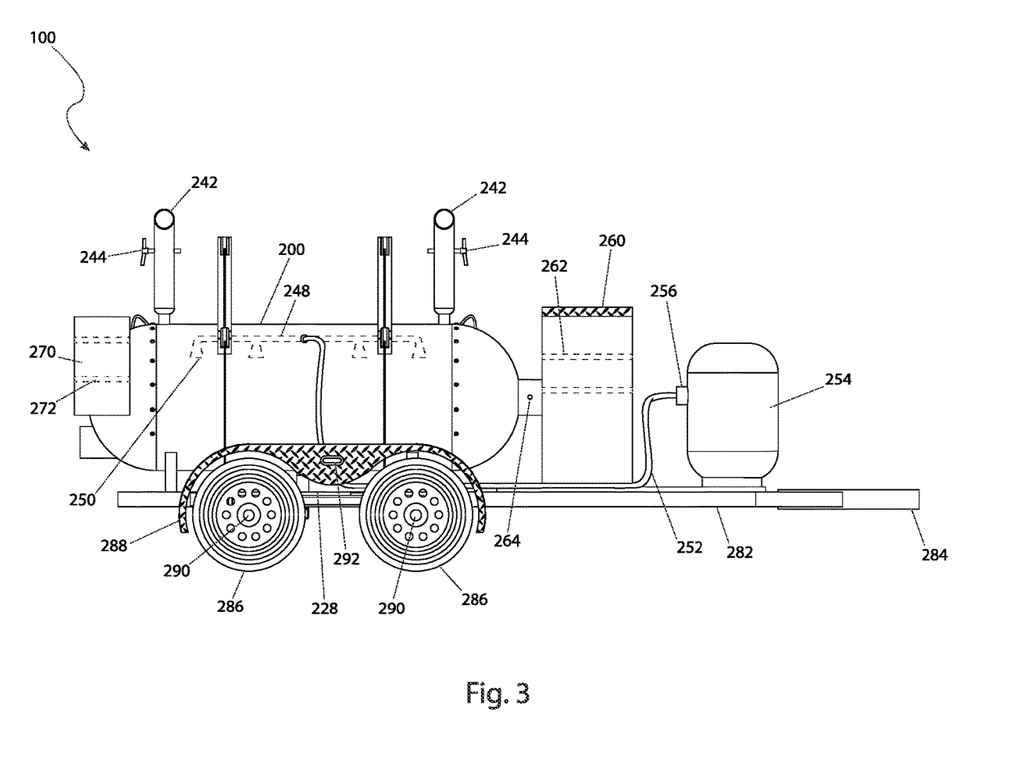
FIG. 3 is a right-side view of a mobile grill with sprinkler system, according to an embodiment of the present invention.
Figure 4:
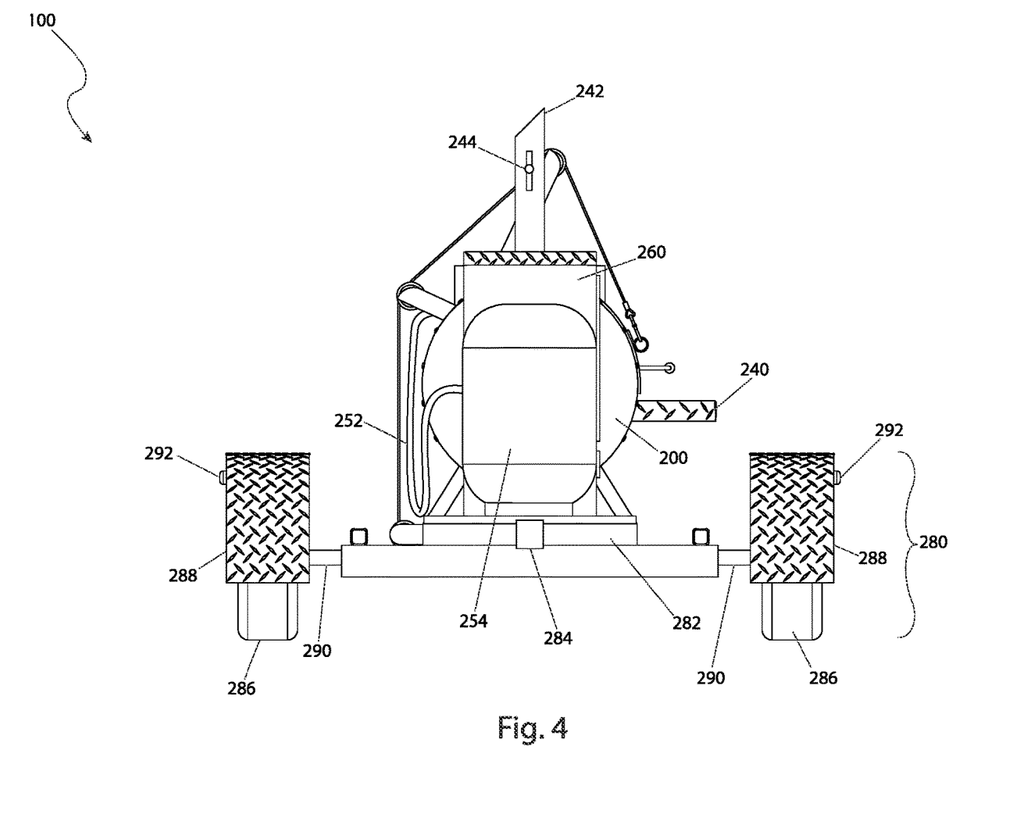
FIG. 4 is a front view of a mobile grill with sprinkler system, according to an embodiment of the present invention.
Figure 5:
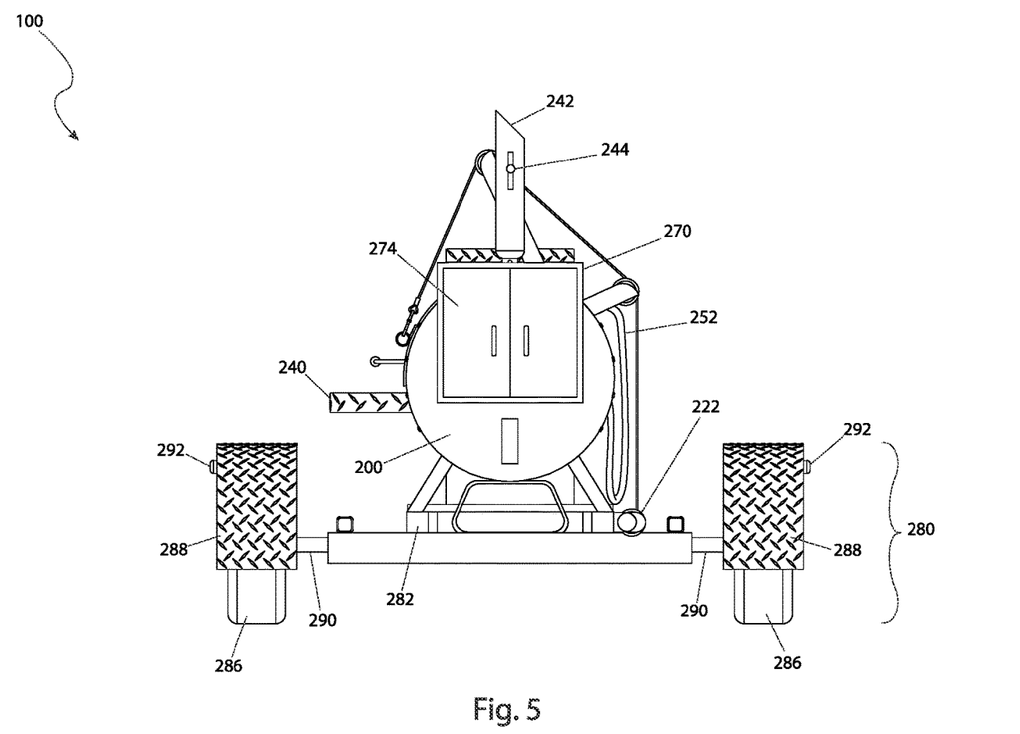
FIG. 5 is a rear view of a mobile grill with sprinkler system, according to an embodiment of the present invention.
Figure 6:
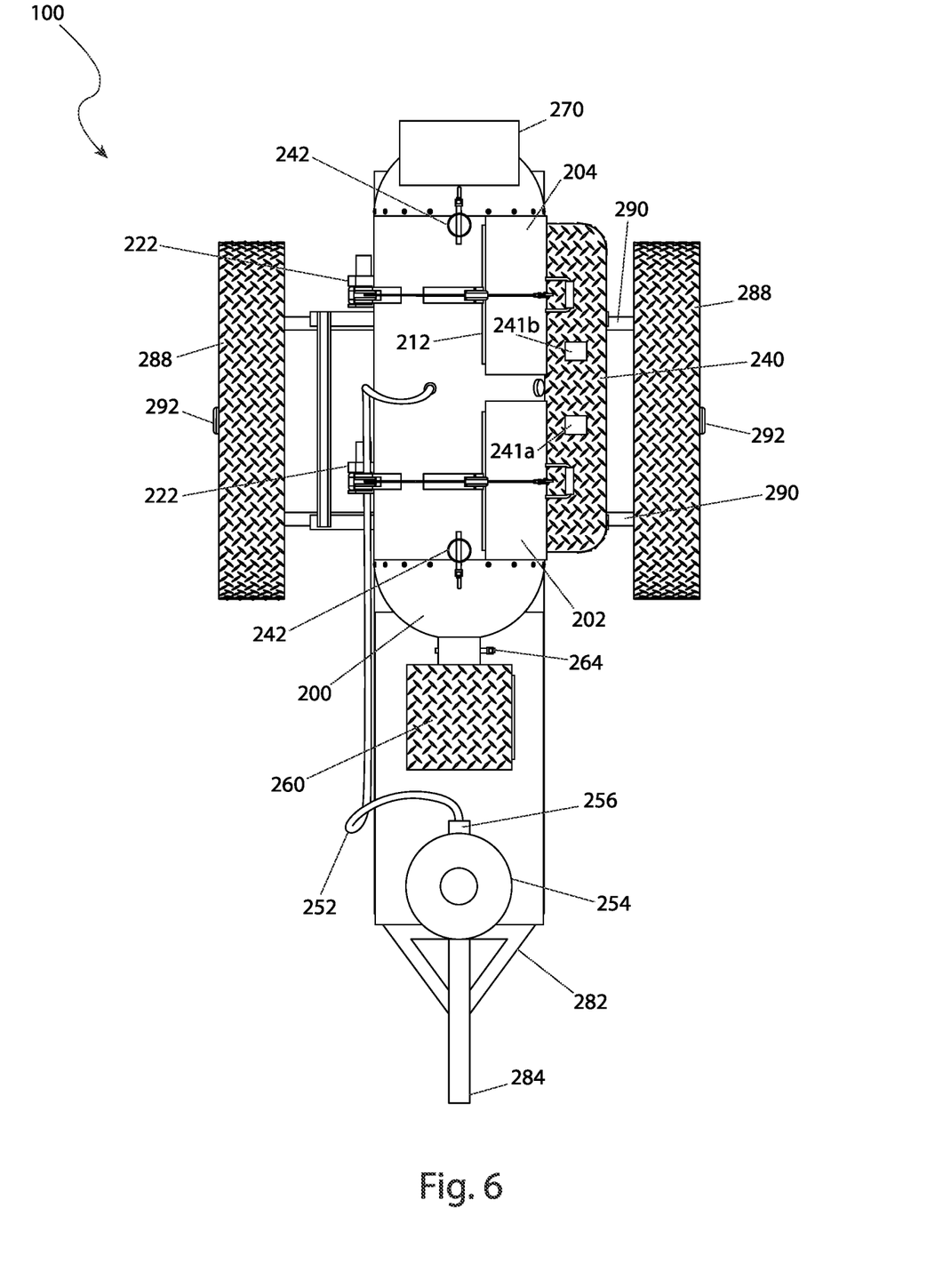
FIG. 6 is a top view of a mobile grill with sprinkler system, according to an embodiment of the present invention.
Figure 7:
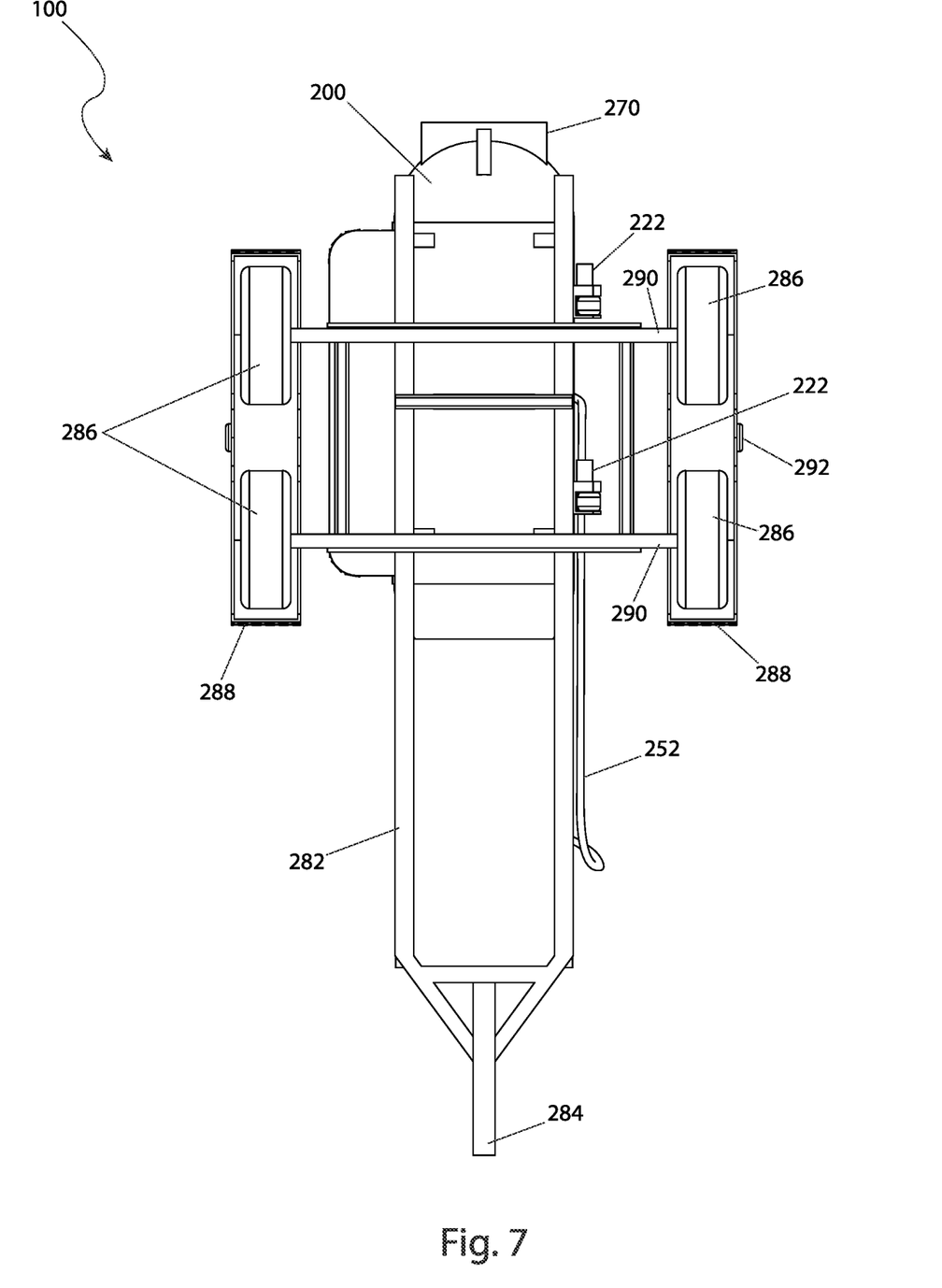
FIG. 7 is a bottom view of a mobile grill with sprinkler system, according to an embodiment of the present invention.

100 mobile grill with sprinkler system
200 grill
202 left door
204 right door
212 hinge
214 door cable 216 door pulley
218 door arm
220 door handle
222 door motor
224 door motor control
228 battery
230 upper rack
232 lower rack
240 work surface
241a first tray
241b second tray
242 smoke stack
244 smoke stack damper
248 distribution pipe
250 sprinkler head
252 supply hose
254 water reservoir
256 water pump
258 sprinkler control
260 smoker
262 smoker rack
264 smoker damper
266 smoker door
270 oven
272 oven rack
274 oven door
280 trailer
282 frame
284 tongue
286 wheel
288 fender
290 axle
292 side marker

DESCRIPTION OF THE INVENTION

The present invention is directed to a mobile grill with sprinkler system (herein described as the "invention") 100. The invention 100 may comprise a grill 200, a sprinkler system, a smoker 260, an oven 270, and a trailer 280. The grill 200, the smoker 260, and the oven 270 may be coupled to the top of the trailer 280 such that the grill 200, the smoker 260, and the oven 270 may be towed to a venue for use. The invention 100 may be operable to cook and/or heat food. As non-limiting examples, the grill 200 and the smoker 260 may be operable to cook meat while the oven 270 maintains side dishes at an elevated temperature. The sprinkler system located within the grill 200 may be adapted to dispense water inside of the grill 200 when activated by a user.

The grill 200 may be a hollow, capsule-shaped enclosure mounted in a horizontal orientation on the trailer 280 above a plurality of wheels 286. A heat source located at the bottom of the grill 200 may heat the interior of the grill 200 in order to cook within the grill 200. As non-limiting examples, the heat source may use charcoal, wood, or propane as a fuel.

The grill 200 may comprise a left door 202 and a right door 204 for accessing the interior of the grill 200. The left door 202 and the right door 204 may define the front of the grill 200. Note that the front of the grill 200 is on a lateral side of the trailer 280. An individual door selected from the left door 202 and the right door 204 may comprise a curved door panel that may conform to the shape of the side of the grill 200. The individual door may cover a grill access aperture when closed and may provide access to the interior of the grill 200 via the grill access aperture when open. The individual door may be hingedly coupled to the grill 200 at the top of the curved door panel via one (1) or more hinges 212. A door cable 214 may be coupled to the individual door above a door handle 220. The door cable 214 may be routed to a door motor 222 via a door pulley 216 located at the top end of a door arm 218 above the individual door. The door motor 222 may be energized to turn in a first rotational direction to open the individual door by pivoting the individual door up using the door cable 214. The door motor 222 may be energized to turn in a second rotational direction to close the individual door by releasing slack in the door cable 214 and allowing the individual door to pivot downward. The door motor 222 may be deenergized to retain the individual door in a fixed position. The door motor 222 may be energized to turn in the first rotational direction, may be energized to turn in the second rotational direction, and may be deenergized using a door motor control 224. The invention 100 may comprise two (2) of the door motor controls 224, one (1) for the left door 202 and one (1) for the right door 204.

The individual door selected from the left door 202 and the right door 204 may provide access to an upper rack 230 and a lower rack 232. The upper rack 230 and the lower rack 232 may be horizontally oriented and the upper rack 230 may be located above the lower rack 232. The upper rack 230 and the lower rack 232 may be configured to support the food while the food is being heated within the grill 200. The upper rack 230 and the lower rack 232 may be supported by a plurality of rack rails that are horizontally oriented and coupled to interior surfaces of the grill 200, with the plurality of rack rails running from front of the grill 200 to rear of the grill 200. The upper rack 230 and the lower rack 232 may slide along the plurality of rack rails such that the upper rack 230 and the lower rack 232 may slide forward for access to the food and may slide rearward to place the upper rack 230 and the lower rack 232 entirely within the grill 200.

A work surface 240 may be coupled to the front of the grill 200 below the left door 202 and the right door 204. The work surface 240 may be horizontally oriented and may extend from the left side of the left door 202 to the right side of the right door 204. As a non-limiting example, the work surface 240 may be configured for use as a table during the preparation of the food. A first tray 241a and a second tray 241b can be installed within the work surface and filled with condiments, packets, or any other item commonly associated with cooking.

The grill 200 may comprise a plurality of smoke stacks 242. The plurality of smoke stacks 242 may be operable to discharge smoke above the grill 200 and to induce a draft through the grill 200. An individual smoke stack selected from the plurality of smoke stacks 242 may comprise a smoke stack damper 244. The smoke stack damper 244 may be closed to block the draft and may be opened to permit the draft to flow.

The sprinkler system may comprise one (1) or more sprinkler heads 250, a supply hose 252, a water reservoir 254, a water pump 256, and a sprinkler control 258. The sprinkler system may be operable to dispense the water within the interior of the grill 200 when the sprinkler system is activated.

The one (1) or more sprinkler heads 250 may be disposed along the top interior of the grill 200. The one (1) or more sprinkler heads 250 may be fluidly coupled to a distribution pipe 248 that is supplied with the water through the rear wall of the grill 200 from the supply hose 252. The other end of the supply hose 252 may be coupled top the water pump 256. The supply hose 252 may be made from a heat resistant material such that the supply hose 252 is not damaged by the heat of the grill 200.

The water pump 256 may be electromechanical and may comprise an internal motor that may be energized by the application of an electrical potential to the water pump 256. The water pump 256 may move the water from the water reservoir 254 into the supply hose 252 when energized. The water pump 256 may be energized when the sprinkler control 258 is placed into a SPRINKLER ON position and may be deenergized when the sprinkler control 258 is placed into a SPRINKLER OFF position.

The smoker 260 may be coupled to the top of the trailer 280 adjacent to the grill 200. The smoker 260 may be operable to maintain a low cooking temperature for an extended period of time while circulating smoke around the meat held on one (1) or more smoker racks 262 within the smoker 260. The smoker 260 may receive heat and/or smoke from the heat source located in the grill 200. In some embodiments, the smoker 260 may comprise a smoker heat source located in the bottom of the smoker 260. The one (1) or more smoker racks 262 may be accessible by opening one (1) or more smoker doors 266. The smoker 260 may share heat, smoke, and/or a ventilation draft with the grill 200 by opening a smoker damper 264 located between the smoker 260 and the grill 200.

The oven 270 may be integrated into the rear of the grill 200 on the top of the trailer 280. The oven 270 may be heated by the heat source located in the grill 200. The oven 270 may be an enclosure that may be operable to heat the food held on one or more oven racks 272 within the oven 270. The one (1) or more oven racks 272 may be accessible by opening one (1) or more oven doors 274.

The trailer 280 may comprise a frame 282, the plurality of wheels 286, fenders 288, and a lighting system. The frame 282 may be an open utility trailer frame. The frame 282 may comprise a tongue 284 at the front of the frame 282 for coupling the invention 100 to a tow vehicle. The tongue 284 may define the front of the trailer 280. The plurality of wheels 286 may be rotationally coupled to one (1) or more axles 290 and the one (1) or more axles 290 may be coupled to the bottom of the trailer 280. The plurality of wheels 286 may be operable to reduce friction between the road and the trailer 280. In some embodiments, the plurality of wheels 286 may be covered by the fenders 288 to prevent mud and debris from being throw against the grill 200 by the plurality of wheels 286.

The lighting system may comprise a plurality of side markers 292, a plurality of rear markers, a plurality of brake lights, a plurality of turn signals, and a license plate light. The lighting system may increase visibility of the trailer 280 at night, may signal changes in speed and/or direction of the trailer 280, may illuminate the license plate, or any combination thereof. The lighting system may be electrically coupled to the electrical system of the tow vehicle via an electrical connector located adjacent to the tongue 284.

A battery 228 may be coupled to the trailer 280. The battery 228 may comprise one (1) or more energy-storage devices. The battery 228 may be a source of electrical energy to operate the door motors 222 and the water pump 256. The battery 228 may be rechargeable and/or replaceable.

In use, the heat source located in the bottom of the grill 200 may be ignited to create heat and/or smoke. The smoke stack dampers 244 located on the plurality of smoke stacks 242 may be opened or closed to varying degrees to control the amount of heat and/or smoke created within the grill 200. The food may be placed upon the upper racks 230 and/or the lower racks 232 located behind the left door 202 and/or the right door 204 in the grill 200, on the one (1) or more oven racks 272 in the oven 270, on the one (1) or more smoker racks 262 in the smoker 260, or any combination thereof. If necessary, the sprinkler system may be activated to suppress a fire within the grill 200. Activation of the sprinkler system may cause the water pump 256 to pump water from the water reservoir 254 through the supply hose 252 to the one (1) or more sprinkler heads 250 located within the grill 200 above the upper racks 230. The invention 100 may be moved between the venues by coupling the tongue 284 of the trailer 280 to a hitch on the tow vehicle.

The exact specifications, materials used, and method of use of the invention 100 may vary upon manufacturing. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A mobile grill with sprinkler system, comprising:
   a trailer having a frame, a tongue at a front end of the frame, a plurality of wheels, and a lighting system electrically coupled to a tow vehicle via an electrical connector located adjacent to the tongue;
   a grill mounted on the trailer, the grill consisting of a capsule-shaped, hollow enclosure in a horizontal orientation above the plurality of wheels, the grill having a left door and a right door defining a front of the grill, each of the door having a curved door panel hingedly coupled at a top of the door to the grill via one or more hinges, and each of the door being coupled to a door cable routed through a door pulley to a door motor, the door motor operable to open and close the respective door via a door motor control;
   a plurality of horizontally oriented rack rails disposed inside the grill and extending from front to rear of the grill;
   an upper rack and a lower rack positioned within the grill, each of the rack supported by and slidable along the rack rails, the upper rack positioned above the lower rack, and each of the rack configured to support food during cooking;
   a sprinkler system disposed within the grill, the sprinkler system consisting of a sprinkler head mounted to a top interior portion of the grill, a heat-resistant supply hose, a water reservoir, a water pump fluidly coupling the reservoir to the sprinkler head via the hose, and a sprinkler control operable to selectively energize or deenergize the water pump;
   a smoker coupled to the trailer adjacent the grill, the smoker comprising a smoker door, one or more smoker racks inside the smoker, and a smoker damper disposed between the smoker and the grill to control a shared flow of heat and smoke;
   an oven integrated into a rear portion of the grill and mounted on the trailer, the oven heated by a heat source of the grill and containing one or more oven racks accessible by opening an oven door;
   a work surface horizontally mounted to the front of the grill beneath the left door and the right door, the work surface containing a first tray and a second tray;

a plurality of smokestacks disposed on top of the grill, each of the smokestack having a damper operable to control a ventilation draft through the grill; and, a battery mounted on the trailer, the battery configured to supply electrical energy to the door motors and the water pump, the battery being rechargeable and replaceable.

2. The mobile grill apparatus of claim 1, wherein:

the sprinkler head is fluidly connected to a distribution pipe traversing a top interior surface of the grill, the distribution pipe receiving water via the supply hose at a rear wall of the grill, and the lighting system includes side markers, rear markers, brake lights, turn signals, and a license plate light, all operable to increase trailer visibility and signal directional changes.

* * * * *